(12) United States Patent
Lee (10) Patent No.: US 9,774,061 B2
(45) Date of Patent: Sep. 26, 2017

(54) BATTERY PACK

(71) Applicant: Samsung SDI Co., Ltd., Yongin-si, Gyeonggi-do (KR)

(72) Inventor: Hyeok Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 223 days.

(21) Appl. No.: 14/467,487

(22) Filed: Aug. 25, 2014

(65) Prior Publication Data

US 2015/0064505 A1  Mar. 5, 2015

(30) Foreign Application Priority Data

Aug. 30, 2013 (KR) .................. 10-2013-0104498

(51) Int. Cl.
| | | |
|---|---|---|
| *H01M 10/42* | (2006.01) | |
| *H01M 2/06* | (2006.01) | |
| *H01M 2/10* | (2006.01) | |
| *H01M 2/20* | (2006.01) | |

(52) U.S. Cl.
CPC ......... *H01M 10/4257* (2013.01); *H01M 2/06* (2013.01); *H01M 2/1066* (2013.01); *H01M 2/204* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2009/0072785 A1* | 3/2009 | Moon | .................... | H01M 2/105 320/112 |
| 2009/0123816 A1* | 5/2009 | Jang | .................... | H01M 2/0202 429/90 |
| 2012/0021268 A1* | 1/2012 | Mailley | ................. | H01M 2/021 429/94 |
| 2012/0135632 A1* | 5/2012 | Maher | .................... | H01R 12/67 439/393 |
| 2014/0178715 A1* | 6/2014 | Koh | ........................ | H01M 2/30 429/7 |

FOREIGN PATENT DOCUMENTS

| | | |
|---|---|---|
| KR | 10-2004-0066671 A | 7/2004 |
| KR | 20-2011-0009384 U | 10/2011 |
| KR | 10-2012-0077901 A | 7/2012 |
| WO | WO 2004/065693 A1 | 8/2004 |

* cited by examiner

*Primary Examiner* — Alix Eggerding
(74) *Attorney, Agent, or Firm* — Knobbe Martens Olson & Bear LLP (57) ABSTRACT

A battery pack is disclosed. In one aspect, the battery pack includes a battery cell and a protective circuit module electrically connected to the battery cell. The protective circuit module includes a substrate and a protective device mounted on the substrate. The battery pack also includes a lower frame including an accommodation space for the battery cell and the protective circuit module and a cover coupled to the lower frame and covering at least a portion of the protective circuit module. The cover includes a protrusion protruding the lower frame and having an uneven surface and the lower frame includes a groove. The protrusion is placed in the groove and secured therein by interference fitting.

20 Claims, 8 Drawing Sheets

BATTERY PACK

CROSS-REFERENCE TO RELATED APPLICATIONS

This application claims the benefit of Korean Patent Application No. 10-2013-0104498, filed on Aug. 30, 2013, in the Korean Intellectual Property Office, the disclosure of which is incorporated herein in its entirety by reference.

BACKGROUND

Field

The described technology generally relates to a battery pack.

Description of the Related Technology

The use of secondary batteries, also known as rechargeable batteries, as power supplies is remarkably increasing with the development and increased use of mobile devices. The type of device using a secondary battery typically determines whether a single-cell or multi-cell secondary battery is used in the device. For example, the power and capacity of the standard single-cell secondary battery may be sufficient to operate a small device such as a cellular phone for a limited time before the next recharge. However, medium or large electronic devices such as laptop computers, portable DVD devices, and small PCs may require high-power, high-capacity multi-cell secondary batteries to meet expected usage requirements between charges.

SUMMARY OF CERTAIN INVENTIVE ASPECTS

One inventive aspect is a battery pack.

Another aspect is a battery pack including a battery cell and a protective circuit module electrically connected to the battery cell, the protective circuit module including a substrate and a protective device mounted on the substrate. The battery pack also includes a lower frame including an accommodation space for the battery cell and the protective circuit module and a cover coupled to the lower frame and covering at least a portion of the protective circuit module, wherein the cover includes a protrusion protruding toward the lower frame and having an uneven surface and the lower frame includes a groove. The protrusion is placed in the groove and secured therein by interference fitting.

The lower frame may further include a lower rib supporting a lower surface of the battery cell and the protective circuit module, an outer wall extending in a direction that is substantially perpendicular to the lower rib, wherein the outer wall defines an inner space together with the lower rib, and an inner wall extending substantially parallel to at least a portion of the outer wall and spaced apart from the outer wall to form the groove.

The inner wall may partially surround the protective device.

The height of the inner wall and the height of the outer wall may satisfy the following expression:

$$0.8 < h_1/h_0 \leq 1$$

where $h_1$ is the height of the inner wall and $h_0$ is the height of the outer wall.

The protective circuit module may further include a connection unit connected to the battery cell and a protective unit extending in a direction that is substantially perpendicular to the connection unit, wherein the protective device is mounted on the protective unit.

The groove and the protrusion may surround at least a portion of the protective unit.

The protective unit may include a connector to electrically connect the battery pack to an external device.

The battery pack may include a filler formed over the connection unit and substantially covering the connection unit.

The protrusion may include an electrical insulator and the protrusion and the electrical insulator may be formed by different material injection molding processes.

The insulator may be formed of rubber or silicone.

Another aspect is a battery pack including a battery cell and a protective circuit module including a connection unit, a protective unit, and a protective device formed over the protective unit, the connection unit being electrically connected to the battery cell. The battery pack also includes a lower frame including an accommodation space for the battery cell and the protective circuit module and a cover coupled to the lower frame and covering at least a portion of the protective circuit module, wherein the cover includes a protrusion protruding toward the lower frame and having an uneven surface and the lower frame includes a groove. The protrusion is placed in the groove and secured therein by interference fitting.

The lower frame may include a first accommodation compartment housing the battery cell and the connection unit of the protective circuit module and a second accommodation compartment formed on a side of the first accommodation compartment and housing the protective unit of the protective circuit module.

The cover may be coupled to the second accommodation compartment of the lower frame.

The second accommodation compartment may include a lower rib forming a bottom side of the lower frame, an outer wall extending in a direction that is substantially perpendicular to the lower rib, and an inner wall extending substantially parallel to at least a portion of the outer wall and spaced apart from the outer wall to form the groove.

The height of the inner wall and the height of the outer wall may satisfy the following expression:

$$0.8 < h_1/h_0 \leq 1$$

where $h_1$ is the height of the inner wall, and $h_0$ is the height of the outer wall The protrusion may include an electrical insulator substantially covering the uneven surface of the protrusion and the protrusion and the electrical insulator may be formed by different material injection molding processes.

The electrical insulator may be formed of rubber or silicone.

The protective unit may include a connector to electrically connect the battery pack to an external device.

The battery pack may further include a filler formed over the connection unit and substantially covering the connection unit.

The battery pack may further include a label substantially covering i) portions of the battery cell and ii) at least a portion of the protective circuit module which are exposed through an opening in the lower frame.

Another aspect is a battery pack, including a battery cell, a protective circuit module electrically connected to the battery cell, a lower frame accommodating the protective circuit module and having a groove, and a cover covering at least a portion of the protective circuit module wherein the cover includes a protrusion inserted into the groove of the lower frame with friction.

The protrusion may have an uneven surface and wherein only a portion of the uneven surface of the protrusion contacts an inner surface of the groove.

The lower frame may further include a lower rib supporting a lower surface of the protective circuit module, an outer wall extending in a direction to cross the lower rib, wherein the outer wall defines an inner space together with the lower rib, and an inner wall i) extending in a direction that is substantially parallel to at least a portion of the outer wall and ii) spaced apart from the outer wall to form the groove.

The height of the inner wall and the height of the outer wall satisfy the following expression:

$$0.8 < h_1/h_0 \leq 1$$

where $h_1$ is the height of the inner wall and $h_0$ is the height of the outer wall.

DETAILED DESCRIPTION OF CERTAIN INVENTIVE EMBODIMENTS

To stably operate a battery pack including one or more battery cells a sufficiently long duration, a stable electrical connection may be required between elements of the battery pack. It may also be necessary to substantially prevent the elements of the battery pack or the electrical connections between the elements from being damaged by external factors such as electrostatic discharge (ESD).

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be omitted from the description in order not to unnecessarily obscure the subject matters of the described technology. It will be understood that although the terms "first" and "second" may be used herein to describe various elements, these elements should not be limited by these terms. These terms are only used to distinguish one element from other elements. In the following description, technical terms are used only for explaining a specific exemplary embodiment while not limiting the described technology. Terms used in a singular form may also include plural forms unless the context clearly indicates otherwise. The meaning of 'include' or 'comprise' as used herein specifies a property, fixed number, step, process, element, component, or combination thereof but does not exclude other properties, fixed numbers, steps, processes, elements, components, and combinations thereof. In the following description, the symbol "/" may be construed as "and" or "or" according to the context.

In the drawings, the thicknesses of layers or regions may be exaggerated for clarity. In addition, like reference numerals refers to like elements throughout. It will be understood that when a layer, film, region, or plate is referred to as being "on" or "above" another layer, film, region, or plate, it can be directly on the other layer, film, region, or plate, or intervening layers, films, regions, or plates may also be present.

Figure 1:
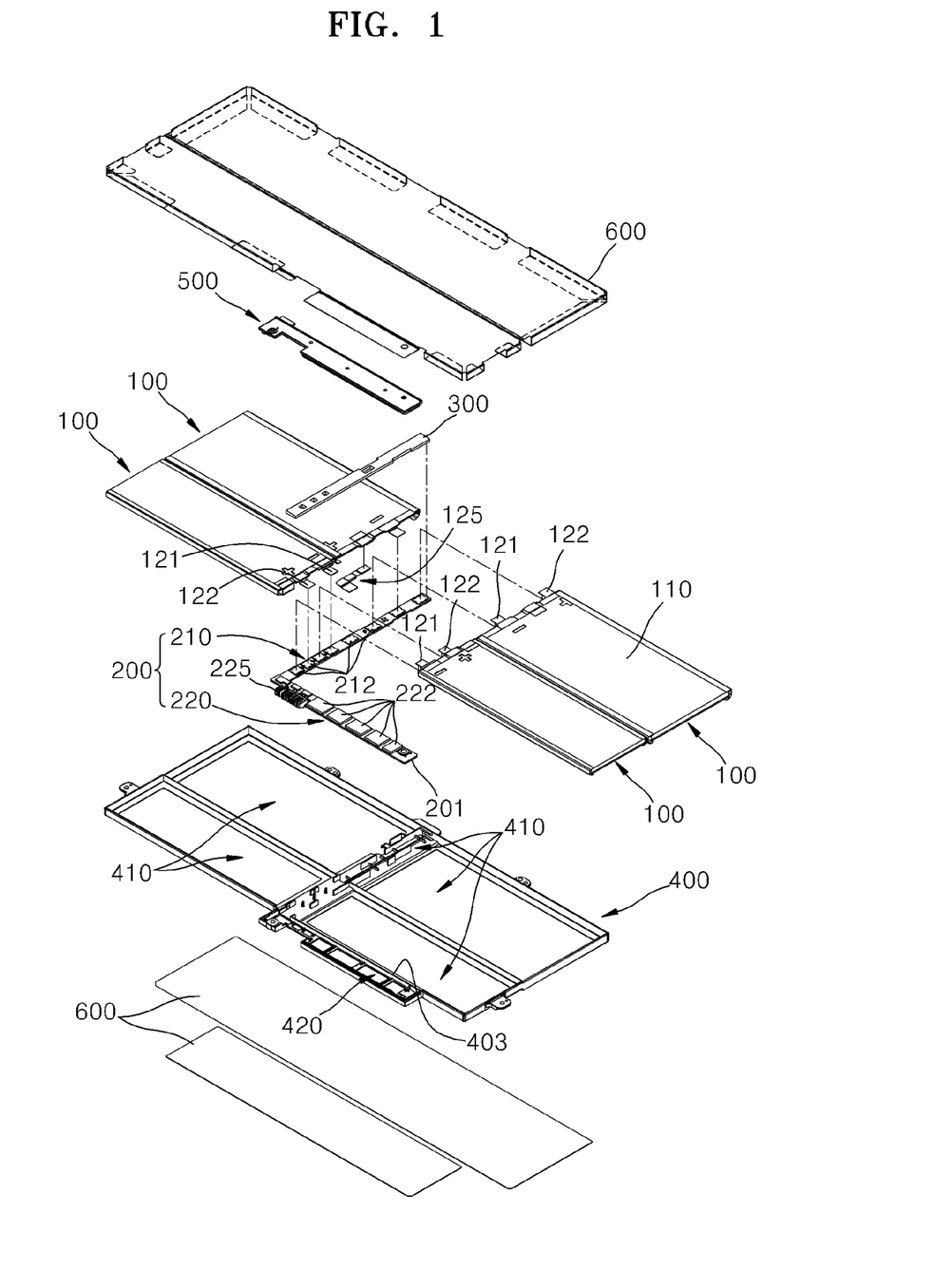
FIG. 1 is an exploded perspective view schematically illustrating a battery pack according to an embodiment.
Figure 2:
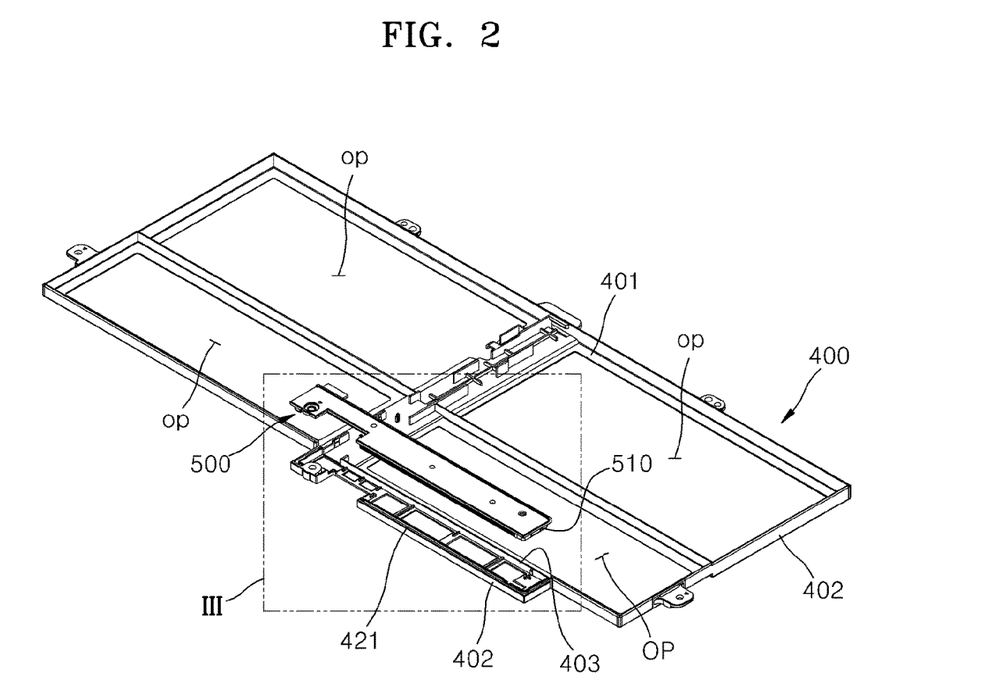
FIG. 2 is a perspective view illustrating the lower frame and the cover depicted in FIG. 1.
Figure 3:
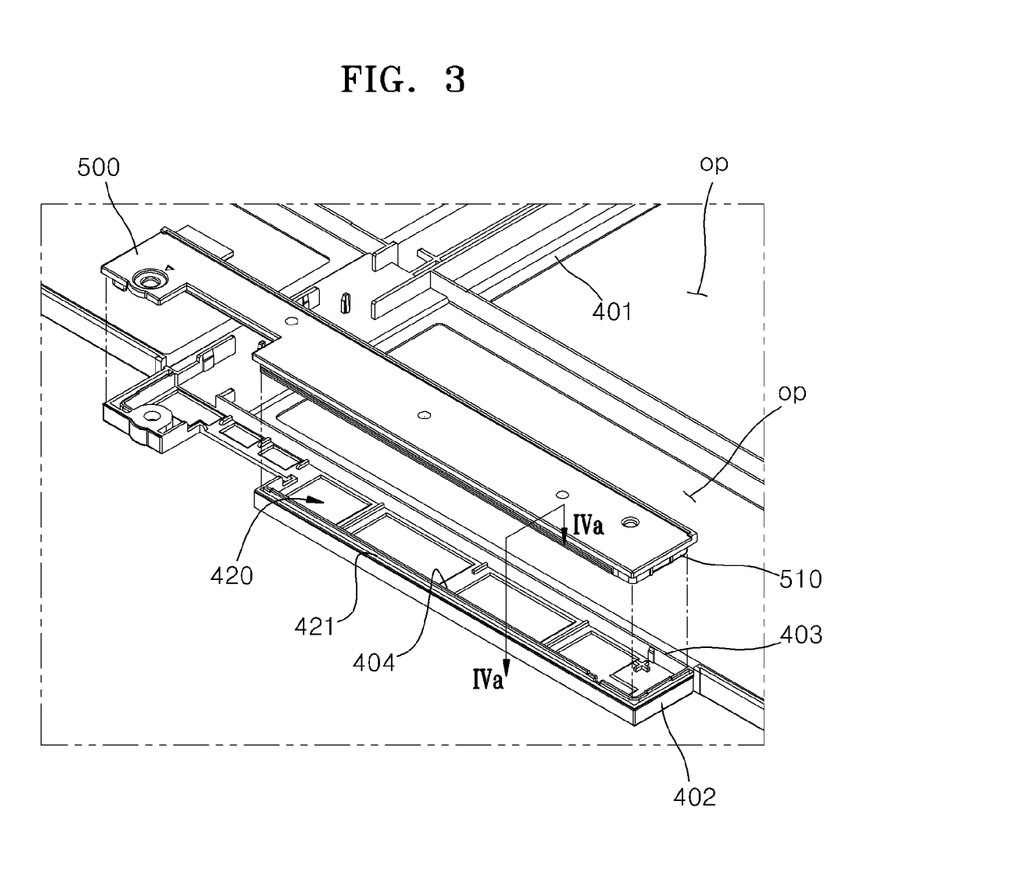
FIG. 3 is an enlarged perspective view illustrating region III of FIG. 2.

FIG. 1 is an exploded perspective view schematically illustrating a battery pack according to an embodiment. FIG. 2 is a perspective view illustrating the lower frame 400 and the cover 500 depicted in FIG. 1. FIG. 3 is an enlarged perspective view illustrating region III of FIG. 2.

Referring to FIG. 1, the battery pack includes battery cells 100, a protective circuit module 200, a filler 300, the lower frame 400, the cover 500, and labels 600.

The battery cells 100 may be rechargeable lithium-ion battery cells. Each of the battery cells 100 may include an electrode assembly (not shown) and a pouch 110 accommodating the electrode assembly. According to some embodiments, the electrode assembly is formed by sequentially stacking a positive electrode plate, a separator, and a negative electrode plate, and winding the stack in the form of a jelly-roll. In other embodiments, the electrode assembly is formed by sequentially stacking a positive electrode plate, a separator, and a negative electrode plate a predetermined number of times. In the current embodiment, the battery cells 100 are lithium-ion battery cells. However, the described technology is not limited thereto. For example, in some embodiments, the battery cells 100 are nickel-cadmium battery cells or nickel-hydrogen battery cells.

Negative electrode tabs 121 and positive electrode tabs 122 protrude from sides of the battery cells 100. The negative electrode tabs 121 may be electrically connected to the negative electrode plates of the electrode assemblies of the battery cells 100, and the positive electrode tabs 122 may be electrically connected to the positive electrode plates of the electrode assemblies of the battery cells 100. The negative electrode tabs 121 or the positive electrode tabs 122, or both the negative and positive electrode tabs 121 and 122 may be electrically connected to a temperature cutoff (TCO) assembly 125. The battery cells 100 may be electrically connected to the protective circuit module 200 by welding the positive electrode tabs 122 or the negative electrode tabs 121, or both the positive and negative electrode tabs 122 and 121 to the TCO assembly 125, and welding the TCO assembly 125 to the protective circuit module 200.

The battery pack may include at least one battery cell 100. As shown in FIG. 1, the negative and positive electrode tabs 121 and 122 of the battery cells 100 may face each other and the protective circuit module 200 may be disposed between mutually-facing sides of the battery cells 100.

The protective circuit module 200 may be electrically connected to the battery cells 100 to prevent overheating and explosion of the battery cells 100 due to overcharging, overdischarging, or overcurrent. The protective circuit module 200 may include a substrate 201 and connection parts 212 and protective devices 222 formed on the substrate 201. The protective devices 222 may be safety devices including passive devices such as resistors or capacitors and/or active devices such as field-effect transistors, or integrated circuits.

The connection parts 212 and the protective devices 222 may be arranged in different regions of the substrate 201. Based on the arrangement of the connection parts 212 and the protective devices 222, the protective circuit module 200 may include a connection unit 210 formed together with a protective unit 220 in one piece. The protective unit may extend in a direction that is substantially perpendicular to the connection unit 210.

For example, the connection unit 210 may include a first region of the substrate 201, and the connection parts 212 formed in the first region. The connection unit 210 may be disposed between the battery cells 100 and the positive/ negative electrode tabs 122 and 121 extending from the battery cells 100 may face each other with the connection unit 210 therebetween. The negative and positive electrode tabs 121 and 122 of the battery cells 100 may be electrically connected to the protective circuit module 200 by being welded thereto.

The protective unit 220 may include a second region of the substrate 201 extending in a direction that is substantially perpendicular to the first region of the substrate 201 and the protective devices 222 mounted in the second region. The protective unit 220 may extend along a side of one of the battery cells 100. The protective unit 220 may further include a connector 225 to connect the battery pack to an external device or region.

The filler 300 may be disposed on the connection unit 210 of the protection circuit module 200. The protective circuit module 200 and the battery cells 100 may be accommodated in the lower frame 400 and fixed to the lower frame 400 by using the labels 600 (described later). In this case, the filler 300 may fill gaps between the connection unit 210 and the labels 600 and substantially cover the connection unit 210 for protection. The filler 300 may include an electrically insulating material such as urethane or silicone. In some embodiments, the filler 300 is formed over the connection unit 210 to fill the gaps between the connection unit 210 and the labels 600.

The lower frame 400 may accommodate the battery cells 100 and the protective circuit module 200 and determine/ define the positions of the battery cells 100 and the protective circuit module 200. The lower frame 400 may be formed of an electrically insulating material such as plastic.

Referring to FIGS. 1 to 3, the lower frame 400 includes a lower rib 401 supporting lower surfaces of the battery cells 100 and the protective circuit module 200 and an outer wall 402 bent (or extending) in a direction that is substantially perpendicular to the lower rib 401. The battery cells 100 and the protective circuit module 200 may be accommodated in an inner space defined by the lower rib 401 and the outer wall 402. The lower rib 401 supports the battery cells 100 and the protective circuit module 200.

A portion of the lower rib 401 which supports the protective circuit module 200 may be a closed-surface. Other portions of the lower rib 401 may include closed-surfaces to support edge portions of the battery cells 100 and openings OP formed in regions corresponding to center regions of the battery cells 100.

A portion of the outer wall 402 may be opened to expose the connector 225 to the environment after the protective circuit module 200 is accommodated in the lower frame 400.

The lower frame 400 may be broadly divided into two compartments by a barrier wall 403. For example, the lower frame 400 may include a first accommodation compartment 410 to accommodate (or house) the battery cells 100 and the connection unit 210 of the protective circuit module 200 and a second accommodation compartment 420 disposed on a side of the first accommodation compartment 410 to accommodate (or house) the protective unit 220 of the protective circuit module 200. The barrier wall 403 may be formed between the first and second accommodation compartments 410 and 420 to separate the first and second accommodation compartments 410 and 420 from each other.

The protective unit 220 of the protective circuit module 200 is disposed in the second accommodation compartment 420. The protective devices 222 of the protective unit 220 may be surrounded by the lower rib 401, the outer wall 402, and the barrier wall 403 forming the second accommodation compartment 420. In the current embodiment, since the connector 225 is formed on the protective unit 220, a portion of the outer wall 402 forming the second accommodation compartment 420 may be opened to expose the connector 225 to the environment.

An inner wall 404 may be formed along the inside of the outer wall 402 forming the second accommodation compartment 420. The inner wall 404 may extend in a direction substantially parallel to at least a portion of the outer wall 402. The inner wall 404 is spaced apart from the outer wall 402 to form a groove 421 therebetween. The inner wall 404 may partially surround the protective devices 222. For example, the inner wall 404 may be formed along the outer wall 402 forming the second accommodation compartment 420 but may not be formed along the barrier wall 403, and thus, the protective devices 222 may be partially surrounded by the inner wall 404. In this case, the groove 421 may be formed around at least a portion of the protective unit 220, for example, around the protective devices 222.

The cover 500 may be coupled to the second accommodation compartment 420 of the lower frame 400, and thus, the protective unit 220 of the protective circuit module 200 may be substantially protected from exposure to the environment. The second accommodation compartment 420, in which the protective unit 220 is accommodated, has a closed bottom side, lateral sides formed by the outer wall 402 of the lower frame 400, and a top side closed by the cover 500. Therefore, the protective unit 220 accommodated in the second accommodation compartment 420 may be substantially protected from exposure to the environment.

The cover 500 includes a protrusion 510 extending toward the lower frame 400. The protrusion 510 can be coupled to the groove 421 of the lower frame 400. For example, the cover 500 may be coupled to the lower frame 400 by inserting the protrusion 510 of the cover 500 into the groove 421 of the lower frame 400 by interference fitting. For example, the protrusion 510 can be press fitted or friction fitted into (or inserted into with friction) the groove 421.

Accordingly, the protective unit 220 of the protective circuit module 200 may be substantially protected from exposure to the environment, and thus, may be protected from external electrostatic discharge (ESD).

ESD may penetrate the protective unit 220 through the interface between the cover 500 and the lower frame 400 and may significantly damage the protective devices 222 of the protective unit 220. In the current embodiment, however, the combination of the protrusion 510 and the groove 421 may elongate the path of ESD penetration and protect the protective devices 222 from ESD. The structure of the protrusion 510 and the coupling structure between the protrusion 510 of the cover 500 and the groove 421 of the lower frame 400 will be described later in detail with reference to FIGS. 4A and 4B.

Referring to FIG. 1, the labels 600 may substantially cover the portions of the battery cells 100 and the protective circuit module 200 which are exposed on the lower frame 400. As described above, the lower rib 401 forming the bottom side of the lower frame 400 is open except for the regions supporting edge portions of the battery cells 100 and the protective circuit module 200. The top side of the lower frame 400 is also opened. Therefore, although the battery cells 100 and the protective circuit module 200 are accommodated in the lower frame 400, the battery cells 100 and a portion of the protective circuit module 200 (i.e., the connection unit 210) may be exposed on the top side and bottom side of the lower frame 400. The labels 600 may substantially cover the exposed portions of the battery cells 100 and at least a portion of the protective circuit module 200.

Hereinafter, the structure of the protrusion 510 and the coupling structure between the protrusion 510 of the cover 500 and the groove 421 of the lower frame 400 will be described in detail with reference to FIGS. 4A and 4B.

Figure 4A:
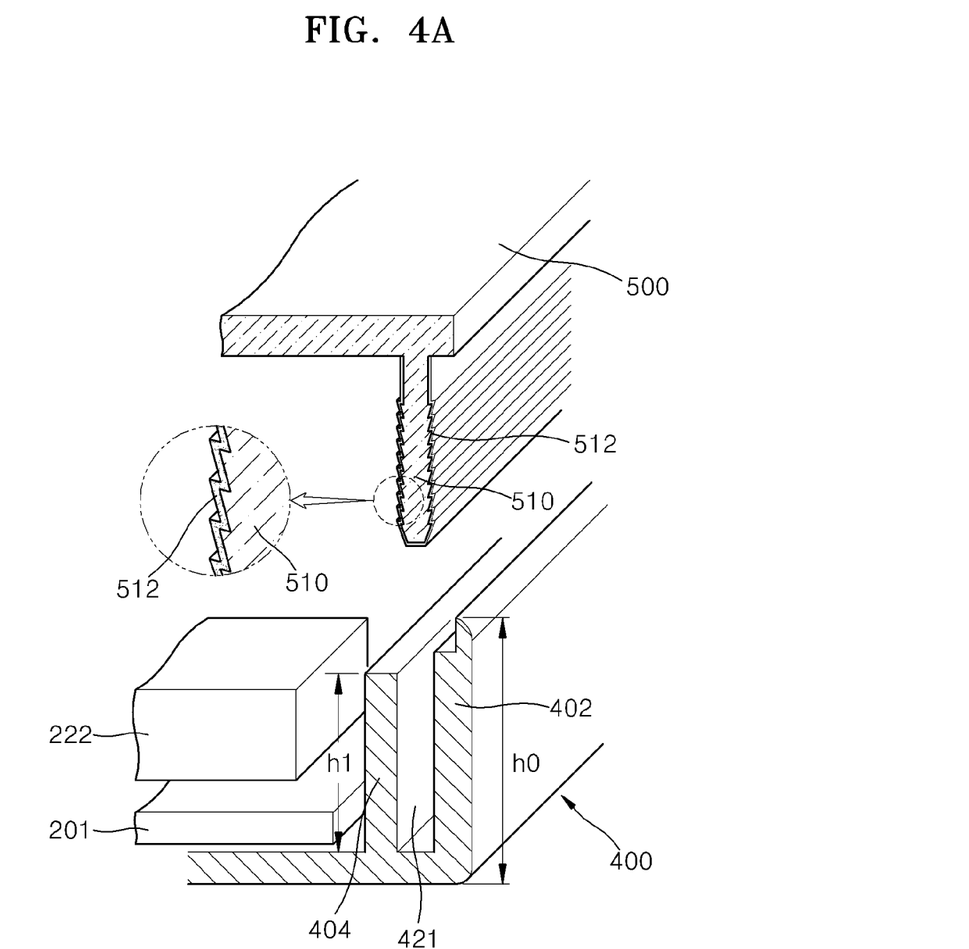
FIG. 4A is a cut-away view taken along line IVa-IVa of FIG. 3.
Figure 4B:
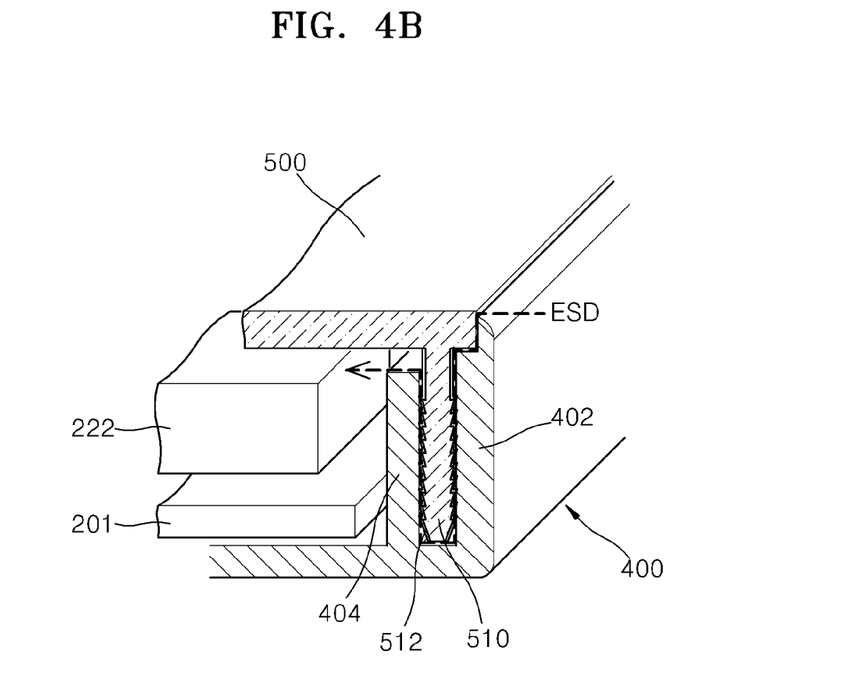
FIG. 4B is a cut-away view illustrating how the cover and the lower frame depicted in FIG. 4A are coupled.

FIG. 4A is a cut-away view taken along line IVa-IVa of FIG. 3 and FIG. 4B is a cut-away view illustrating how the cover 500 and the lower frame 400 depicted in FIG. 4A are coupled.

Referring to FIGS. 4A and 4B, the groove 421 of the lower frame 400 is formed by the inner wall 404 and the outer wall 402, and the protrusion 510 is formed on the cover 500.

The protrusion 510 may be sufficiently long so that the bottom side of the protrusion 510 may contact the bottom side (the lower rib 401) of the lower frame 400. This may elongate ESD penetration paths along the interface between the cover 500 and the lower frame 400, and thus, ESD damage may be substantially prevented or minimized.

Although the protrusion 510 is sufficiently long, if the groove 421 formed between the inner wall 404 and the outer wall 402 is not sufficiently deep, ESD may penetrate through relatively short paths formed between the cover 500 and the lower frame 400, and thus, the protective devices 222 may be more easily damaged.

To substantially prevent this, the inner wall 404 and the outer wall 402 may satisfy the following expression:

$$0.8 < h_1/h_0 \leq 1$$

where $h_1$ denotes the height of the inner wall 404 and $h_0$ denotes the height of the outer wall 402.

If the ratio of the height $h_1$ of the inner wall 404 and the height $h_0$ of the outer wall 402 is outside the range specified by the expression ($0.8 < h_1/h_0 \leq 1$), ESD penetration paths may be relatively short, and thus, it may be difficult to protect the protective devices 222.

In addition, the sum of the height $h_1$ of the inner wall 404 and the height $h_0$ of the outer wall 402 may be about 11 mm or greater to substantially prevent or minimize ESD damage.

As described above, the protective devices 222 may be substantially protected from ESD by using the structure of the inner wall 404 and the outer wall 402 extending substantially parallel to each other and satisfying the above conditions. However, the coupling force between the cover 500 and the lower frame 400 may not be sufficient. In the current embodiment, however, the protrusion 510 of the cover 500 has an uneven surface, and thus, the coupling force between the cover 500 and the lower frame 400 may be sufficient. The protrusion 510 having an uneven surface is inserted into the groove 421 and the uneven surface of the protrusion 510 increases the coupling force between the protrusion 510 and the groove 421 due to the interference fit therebetween. Thus, the protrusion 510 is secured in the groove 421 due to the coupling force therebetween.

The protrusion 510 may include an insulator 512 on the uneven surface. The insulator 512 may be an electrical insulator. The protrusion 510 and the insulator 512 may be formed by different material injection molding processes. Since the protrusion 510 has an uneven surface, the insulator 512 may also have an uneven surface. The insulator 512 may be formed of a material such as rubber or silicone. The insulator 512 may increase the coupling force between the protrusion 510 and the groove 421.

Figure 5A:
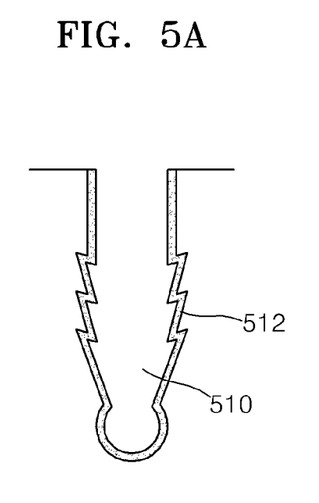
FIGS. 5A and 5B are cross-sectional views illustrating a protrusion of the lower frame according to another embodiment.
Figure 5B:
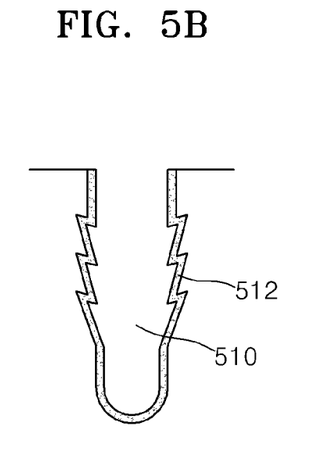

In the embodiment shown in FIGS. 4A and 4B, the protrusion 510 has a flat bottom side. However, the described technology is not limited thereto. As shown in FIGS. 5A and 5B, the protrusion 510 may have a round bottom side. In some embodiments, the groove 421 and the protrusion 510 have corresponding cross-sectional shapes as shown in FIGS. 5A and 5B. In these cases, the path of ESD penetration may be elongated due to the cross-sectional shapes of the groove 421 and protrusion 510.

Figure 6A:
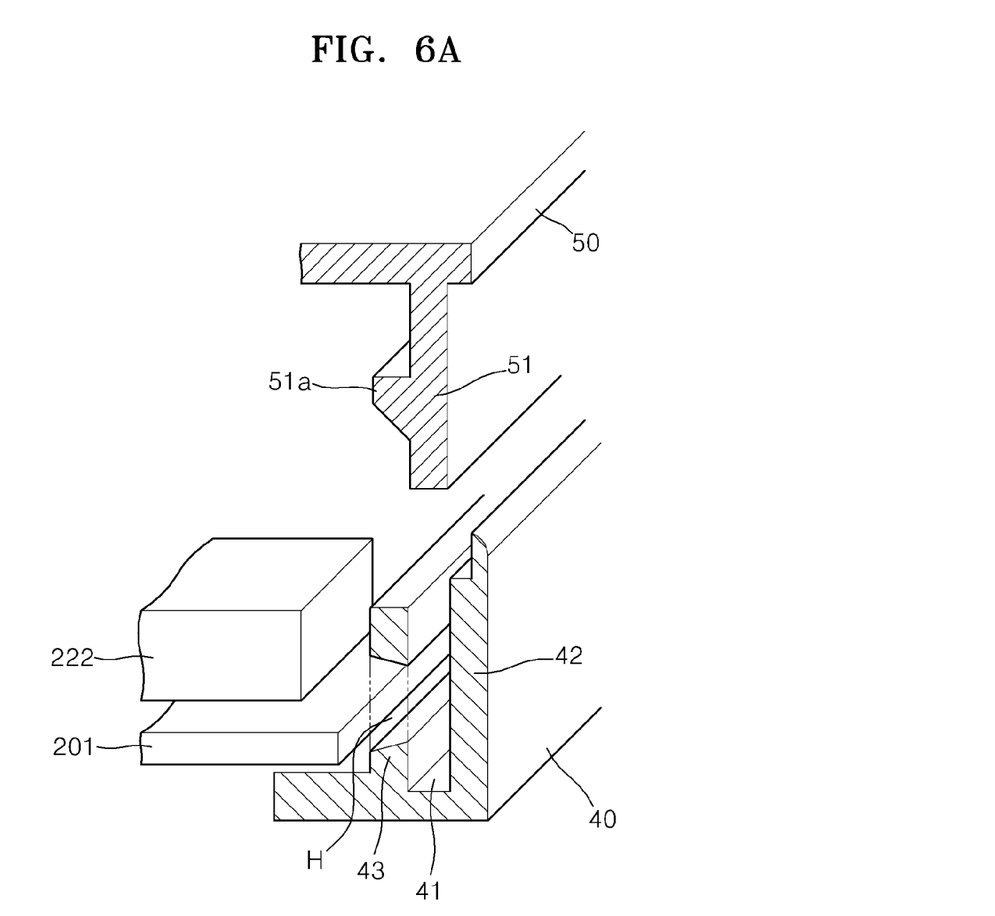
FIGS. 6A and 6B are cross-sectional views illustrating how a lower frame and a cover are coupled to each other in a comparative example.
Figure 6B:
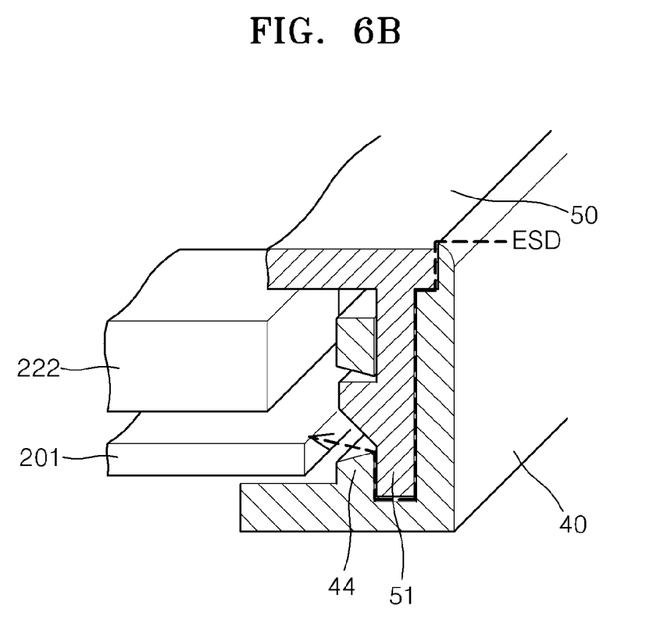

FIGS. 6A and 6B are cross-sectional views illustrating how a lower frame 40 and a cover 50 are coupled to each other in a comparative example.

Referring to FIGS. 6A and 6B, the cover 50 and the lower frame 40 of the comparative example may have a hook coupling structure. In the comparative example, a groove 41 is formed between an outer wall 42 and an inner wall 43 of the lower frame 40, and a protrusion 51 is formed in the cover 50. The cover 50 and the lower frame 40 of the comparative example are different from the cover 500 and the lower frame 400 of the embodiment of the described technology in that a hole (H) is formed in the inner wall 43 and an insertion jaw 51a is formed on the protrusion 51.

An ESD test was performed on the battery pack including the cover 500 and the lower frame 400 according to the embodiment of the described technology and a battery pack including the cover 50 and the lower frame 40 according to the comparative example. In the ESD test, the battery packs were subjected to about ±6 kV ESD and about ±8 kV ESD.

The battery pack of the comparative example was damaged by ESD, especially in the case where about ±8 kV ESD was applied. However, the battery pack of the embodiment of the described technology was not damaged by the application of either the about ±6 kV ESD or the about ±8 kV ESD.

As shown in FIG. 6B, since the battery pack of the comparative example has a hook coupling structure, ESD may affect protective devices 222 through the hole (H) formed in the inner wall 43. However, in the battery pack of the embodiment of the described technology, relatively long ESD penetration paths may be formed between the inner wall 404 and the outer wall 402 extending substantially parallel to each other and satisfying the above-described conditions. Consequently, ESD may be substantially prevented from damaging the protective devices 222.

As described above, according to the embodiments of the described technology, the connection unit 210 for connection with the battery cells 100 and the protective unit 220 on which the protective devices 222 are mounted are provided in different regions of the protective circuit module 200. The protective unit 220 is also substantially protected using the lower frame 400 and the cover 500. Therefore, the protective devices 222 may be substantially protected from ESD.

In the second accommodation compartment 420 of the lower frame 400, the protective devices 222 of the protective unit 220 may be safely protected from ESD due to the configurations of the inner wall 404, the outer wall 402, the protrusion 510, and the groove 421 satisfying the above-described structure and height conditions.

In addition, the coupling force between the cover 500 and the lower frame 400 may be increased by the uneven surface of the protrusion 510 and the insulator 512 formed together with the protrusion 510 by different material injection molding.

As described above, according to at least one embodiment of the described technology, the protective circuit module 200 of the battery pack may be substantially protected from ESD.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the described technology have been described with reference to the figures, it will be understood by those of ordinary skill in the art that various changes in form and details may be made therein without departing from the spirit and scope of the present invention as defined by the following claims.

What is claimed is:

1. A battery pack, comprising:
    a battery cell;
    a protective circuit module electrically connected to the battery cell, wherein the protective circuit module comprises a substrate and a protective device mounted on the substrate;
    a lower frame including i) an accommodation space for the battery cell and the protective circuit module, and ii) an inner wall and an outer wall which are adjacent to the protective device, wherein the inner wall and the outer wall are spaced apart from each other such that a groove is between the inner wall and the outer wall; and
    a cover covering at least a portion of the protective circuit module, wherein the cover comprises a protrusion protruding toward the lower frame and having an uneven surface, wherein the protrusion has a plate shape,
    wherein the protrusion is accommodated in a groove of the lower frame by way of frictional force, and wherein the protrusion includes a first surface facing the outer wall, and a second surface facing the inner wall and entirely covered by the inner wall.

2. The battery pack of claim 1, wherein the lower frame further comprises:
    a lower rib supporting a lower surface of the battery cell and the protective circuit module;
    the outer wall extending in a direction that is substantially perpendicular to the lower rib, wherein the outer wall defines an inner space together with the lower rib; and
    the inner wall extending in a direction that is substantially parallel to at least a portion of the outer wall.

3. The battery pack of claim 1, wherein the inner wall partially surrounds the protective device.

4. The battery pack of claim 1, wherein the height of the inner wall and the height of the outer wall satisfy the following expression:

$$0.8 < h_1/h_0 < 1$$

where $h_1$ is the height of the inner wall and $h_0$ is the height of the outer wall.

5. The battery pack of claim 1, wherein the protective circuit module further comprises:
    a connection unit electrically connected to the battery cell; and
    a protective unit extending in a direction that is substantially perpendicular to the connection unit, wherein the protective device is mounted on the protective unit.

6. The battery pack of claim 5, wherein the groove and the protrusion surround at least a portion of the protective unit.

7. The battery pack of claim 5, wherein the protective unit comprises a connector to electrically connect the battery pack to an external device.

8. The battery pack of claim 5, further comprising a filler formed over the connection unit and substantially covering the connection unit.

9. The battery pack of claim 1, wherein the protrusion comprises an electrical insulator formed on the uneven surface.

10. The battery pack of claim 9, wherein the electrical insulator is formed of rubber or silicone.

11. A battery pack, comprising:
    a battery cell;
    a protective circuit module comprising a connection unit, a protective unit, and a protective device formed over the protective unit, wherein the connection unit is electrically connected to the battery cell;
    a lower frame accommodating the battery cell and the protective circuit module, wherein the lower frame includes an inner wall and an outer wall which are spaced apart from each other with a groove therebetween; and
    a cover covering at least a portion of the protective circuit module, wherein the cover comprises a protrusion protruding toward the lower frame and having an uneven surface, wherein the protrusion is friction fitted into a groove of the lower frame, wherein the protrusion includes a first surface facing the outer wall, and a second surface facing the inner wall and entirely covered by the inner wall, and wherein the protrusion has a plate shape.

12. The battery pack of claim 11, wherein the lower frame comprises:
    a first accommodation compartment housing the battery cell and the connection unit; and a second accommodation compartment formed on a side of the first accommodation compartment and housing the protective unit.

13. The battery pack of claim 12, wherein the cover is connected to the second accommodation compartment.

14. The battery pack of claim 12, wherein the second accommodation compartment comprises:
    a lower rib forming a bottom side of the lower frame;
    the outer wall extending in a direction so as to cross the lower rib; and
    the inner wall extending in a direction that is substantially parallel to at least a portion of the outer wall.

15. The battery pack of claim 11, wherein the height of the inner wall and the height of the outer wall satisfy the following expression:

$$0.8 < h_1/h_0 \leq 1$$

where $h_1$ is the height of the inner wall and $h_0$ is the height of the outer wall.

16. The battery pack of claim 11, wherein the protrusion comprises an electrical insulator substantially covering the uneven surface of the protrusion.

17. The battery pack of claim 16, wherein the electrical insulator is formed of rubber or silicone.

18. The battery pack of claim 11, wherein the protective unit comprises a connector to electrically connect the battery pack to an external device.

19. The battery pack of claim 11, further comprising a filler formed over the connection unit and substantially covering the connection unit.

20. The battery pack of claim 11, further comprising a label substantially covering i) portions of the battery cell and ii) at least a portion of the protective circuit module which are exposed through an opening in the lower frame.

* * * * *